US010328519B2

(12) United States Patent
Kasler et al.

(10) Patent No.: US 10,328,519 B2
(45) Date of Patent: Jun. 25, 2019

(54) APPARATUS FOR ROTARY FRICTION WELDING AND A METHOD OF ROTARY FRICTION WELDING

(71) Applicant: ROLLS-ROYCE plc, London (GB)

(72) Inventors: Richard D Kasler, Husbands Bosworth (GB); Mark C Ireland, Swadlincote (GB)

(73) Assignee: ROLLS-ROYCE plc, London (GB)

( * ) Notice: Subject to any disclaimer, the term of this patent is extended or adjusted under 35 U.S.C. 154(b) by 210 days.

(21) Appl. No.: 15/333,937

(22) Filed: Oct. 25, 2016

(65) Prior Publication Data
US 2017/0144247 A1   May 25, 2017

(30) Foreign Application Priority Data

Nov. 24, 2015  (GB) .................................. 1520671.7

(51) Int. Cl.
*B23K 20/12* (2006.01)
*B23K 20/26* (2006.01)
(Continued)

(52) U.S. Cl.
CPC .......... *B23K 20/1205* (2013.01); *B23K 20/02* (2013.01); *B23K 20/129* (2013.01); *B23K 20/26* (2013.01); *B23K 2101/001* (2018.08)

(58) Field of Classification Search
CPC .. B23K 20/12; B23K 20/1285; B23K 20/129; F16D 11/04; F16D 11/10
See application file for complete search history.

(56) References Cited

U.S. PATENT DOCUMENTS 3,080,031 A * 3/1963 Young .................... F16D 11/10
192/101
3,414,096 A * 12/1968 Reed .................. B60K 17/3515
192/38
(Continued)

FOREIGN PATENT DOCUMENTS

DE   102010025239 A1   12/2011
GB       2432547 A      5/2007
(Continued)

OTHER PUBLICATIONS

Jun. 13, 2016 Search Report issued in Great Britain Patent Application No. 1520671.7.
(Continued)

*Primary Examiner* — Erin B Saad
*Assistant Examiner* — Carlos J Gamino
(74) *Attorney, Agent, or Firm* — Oliff PLC (57) ABSTRACT

A friction welding apparatus has first and second clamps for respectively holding first and second parts to be welded by rotary friction welding, a device for producing relative rotation between the first and second clamps and a forge for applying an axial forging pressure to the parts to be welded when the parts are located in the clamps. The second clamp is mounted on a first half of a coupling. A second half of the coupling is movable axially between first and second positions. In the first position the second half of the coupling is engaged with the first half to prevent rotation of the second clamp and enable relative rotation between the first and second clamps. In the second position the second half of the coupling is disengaged from the first half to enable rotation of the second clamp and stop relative rotation between the first and second clamps.

19 Claims, 5 Drawing Sheets

(51) Int. Cl.
*B23K 20/02* (2006.01)
*B23K 101/00* (2006.01)

(56) References Cited

U.S. PATENT DOCUMENTS

| | | | | | |
|---|---|---|---|---|---|
| 3,564,703 | A | * | 2/1971 | Kiwalle | B23K 20/121 156/73.5 |
| 3,599,857 | A | | 8/1971 | Loyd et al. | |
| 3,694,896 | A | * | 10/1972 | Loyd | B23K 20/12 156/580 |
| 3,750,927 | A | * | 8/1973 | Miller | B23K 20/121 156/73.5 |
| 3,753,820 | A | * | 8/1973 | Ishikawa | B23K 20/12 156/580 |
| 3,954,215 | A | * | 5/1976 | Takagi | B23K 20/121 228/2.3 |
| 4,067,490 | A | * | 1/1978 | Jones | B23K 20/121 228/102 |
| 4,212,557 | A | * | 7/1980 | Overbeek | F16D 11/14 192/36 |
| 4,625,846 | A | * | 12/1986 | Gomez | B60B 35/18 180/247 |
| 4,757,932 | A | * | 7/1988 | Benn | B23K 20/121 228/102 |
| 5,353,890 | A | * | 10/1994 | Clohessy | B60K 17/3515 180/247 |
| 5,779,414 | A | * | 7/1998 | Adkins | F16D 1/0894 411/317 |
| 6,129,187 | A | * | 10/2000 | Bellanger | B60K 17/28 192/3.58 |
| 6,289,986 | B1 | * | 9/2001 | Wright | E21B 43/126 166/117.7 |
| 2009/0001136 | A1 | * | 1/2009 | Dzialas | B23K 20/12 228/114.5 |

FOREIGN PATENT DOCUMENTS

| | | |
|---|---|---|
| GB | 2497287 A | 6/2013 |
| JP | 2003062676 A | 3/2003 |
| SU | 716743 A1 | 2/1980 |

OTHER PUBLICATIONS

Jul. 24, 2017 Search Report issued in European Patent Application No. 16195401.

* cited by examiner

FIG. 1
CONVENTIONAL

APPARATUS FOR ROTARY FRICTION WELDING AND A METHOD OF ROTARY FRICTION WELDING

The present disclosure concerns an apparatus for rotary friction welding and a method of rotary friction welding.

Typically, a friction welding apparatus comprises a first clamp for holding a first part and a second clamp for holding a second part to be welded by rotary friction welding. A motor and an associated drive rotate the first clamp and the first part relative to the second clamp and the second part. An axial forging pressure pushes the second clamp and the second part into contact with the first part to friction weld the parts together.

A rotary friction welding apparatus relies on inertia to produce a successful weld.

A problem with the rotary friction welding apparatus is that it is difficult to rapidly, or instantaneously, decelerate the friction welding apparatus due to the large inertia, or large mass, of the friction welding apparatus. Alternatively, the problem may be considered to be that it is difficult to rapidly, or instantaneously, decouple the parts that have been friction welded together from the friction welding apparatus, e.g. to decouple the parts from the first clamp or the second clamp.

The present disclosure seeks to provide a friction welding apparatus which reduce, or overcomes, the above mentioned problem.

According to a first aspect of the present disclosure there is provided a rotary friction welding apparatus comprising a first clamp for holding a first part to be welded by rotary friction welding, a second clamp for holding a second part to be welded by rotary friction welding, a device for producing relative rotation between the first clamp and the second clamp, a forge for applying an axial forging pressure to the parts to be welded when the parts are located in the clamps, the second clamp being mounted on a first half of a coupling, a second half of the coupling being movable axially between a first position and a second position, wherein in the first position the second half of the coupling is engaged with the first half of the coupling to enable relative rotation between the first clamp and the second clamp and in the second position the second half of the coupling is disengaged from the first half of the coupling to stop relative rotation between the first clamp and the second clamp.

The device for producing relative rotation may be arranged to rotate the first clamp, the second half of the coupling is mounted on a rotationally static structure, wherein in the first position the second half of the coupling is engaged with the first half of the coupling to prevent rotation of the second clamp and enable relative rotation between the first clamp and the second clamp and in the second position the second half of the coupling is disengaged from the first half of the coupling to enable rotation of the second clamp and stop relative rotation between the first clamp and the second clamp.

The first clamp may be mounted on a rotationally static structure, the device for producing relative rotation may be arranged to rotate the second half of the coupling, wherein in the first position the second half of the coupling is engaged with the first half of the coupling to rotate the second clamp and enable relative rotation between the first clamp and the second clamp and in the second position the second half of the coupling is disengaged from the first half of the coupling to stop rotation of the second clamp and stop relative rotation between the first clamp and the second clamp.

The first and second half couplings may be first and second half curvic couplings. Alternatively, the first and second half couplings may be first and second half Hirth couplings.

The rotary friction welding apparatus may comprise a hollow main body, a rotor and a carrier, the rotor and the carrier are arranged coaxially within the hollow body, the rotor is rotatably mounted in the hollow main body, the second clamp is arranged on a first axial end of the rotor, the first half of the coupling is arranged on a second axial end of the rotor, the carrier is axially movable and non rotatably mounted in the hollow main body and the second half of the coupling is arranged on a first axial end of the carrier.

The rotor may be rotatably mounted in the hollow main body by at least one bearing. The rotor may be rotatably mounted in the hollow main body by two bearings. A first bearing may be a thrust bearing and a second bearing may be a roller bearing. The first bearing may be a spherical thrust bearing and the second bearing may be a tapered roller bearing.

The hollow main body may have a plurality of axially extending slots, the carrier has a plurality of radially extending members and each radially extending member of the carrier locates in a respective one of the axially extending slots in the hollow main body.

Each radially extending member may comprise an anti-rotation bearing. Each anti-rotation bearing may comprise a pin, a first ring and a second ring, the first ring has a part spherical outer surface, the first ring is arranged around the pin, the second ring has a part spherical inner surface, the second ring is arranged around the first ring, the pin is arranged to locate in an aperture in the carrier.

The first axial end of the carrier may have a coaxial spigot, the second end of the rotor having a coaxial bore.

The rotary friction welding apparatus may comprise an actuator to move the second half of the coupling into and out of engagement with the first half of the coupling. The actuator may comprise a pneumatic actuator, a hydraulic actuator or an electric actuator.

A sensor may be arranged to measure the speed of rotation of the rotor. The sensor may be arranged to measure the rotational position of the rotor. The sensor may comprise an induction sensor, the induction sensor is mounted on the hollow main body and the rotor comprises a plurality of circumferentially spaced radially extending teeth.

According to a second aspect of the present disclosure there is provided a method of rotary friction welding a first part to a second part the method comprising the steps of locating the first part in a first clamp, locating the second part in a second clamp, the second clamp being mounted on a first half of a coupling, a second half of the coupling being movable axially between a first position in which the second half of the coupling is engaged with the first half of the coupling and a second position in which the second half of the coupling is disengaged from the first half of the coupling, the method further comprising positioning the second half of the coupling in the first position to enable relative rotation between the first part and the second part, rotating the first part relative to the second part and applying an axial forging pressure to friction weld the first part to the second part, and moving the second half of the coupling to the second position to disengage the second half of the coupling from the first half of the coupling to stop relative rotation between the first part and the second part to allow the friction weld to solidify.

The method may comprise rotating the first clamp, mounting the second half of the coupling on a rotationally static structure, the method further comprising positioning the second half of the coupling in the first position to prevent rotation of the second clamp and enable relative rotation between the first clamp and the second clamp and moving the second half of the coupling to the second position to disengage the second half of the coupling from the first half of the coupling to enable rotation of the second clamp and stop relative rotation between the first clamp and the second clamp.

The first and second parts may be a rotor and a shaft. The rotor may be a drum or a disc. The drum may be a compressor drum. The discs may be compressor disc or a turbine disc.

The first part may be a first rotor and the second part is a second rotor. The first and second rotors may be compressor discs or turbine discs.

The first part may be a first shaft and the second part is a second shaft.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which.

Figure 1:
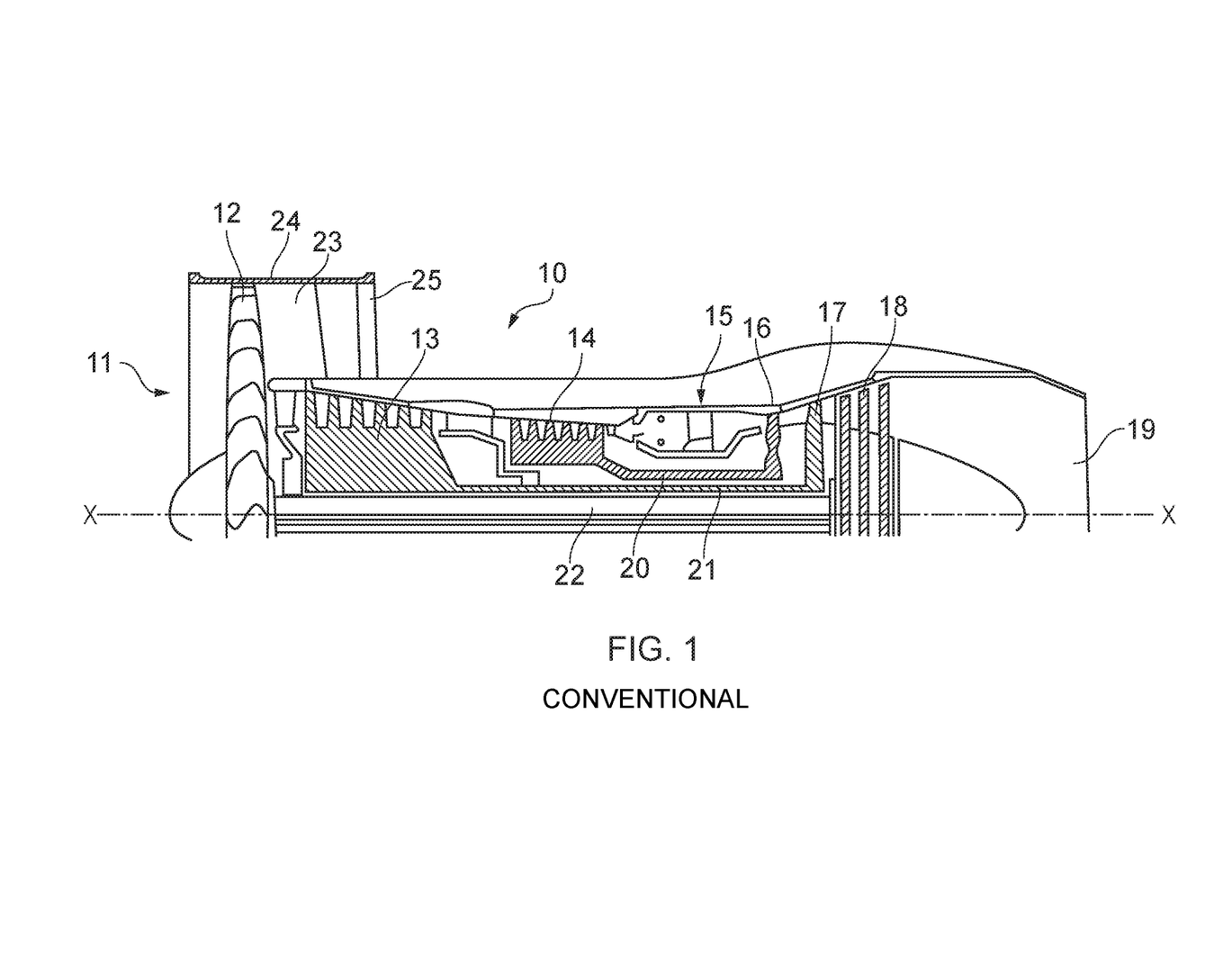
FIG. 1 is a sectional side view of a gas turbine engine.

With reference to FIG. 1, a gas turbine engine is generally indicated at 10, having a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and an exhaust nozzle 19. A fan nacelle 24 generally surrounds the fan 12 and defines the intake 11 and a fan duct 23. The fan nacelle 24 is secured to the core engine by fan outlet guide vanes 25.

The gas turbine engine 10 works in the conventional manner so that air entering the intake 11 is accelerated by the fan 12 to produce two air flows: a first air flow into the intermediate pressure compressor 13 and a second air flow which passes through the bypass duct 23 to provide propulsive thrust. The intermediate pressure compressor 13 compresses the air flow directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high 16, intermediate 17 and low 18 pressure turbines drive respectively the high pressure compressor 14, intermediate pressure compressor 13 and fan 12, each by suitable interconnecting shaft 20, 21 and 22 respectively.

Figure 2:
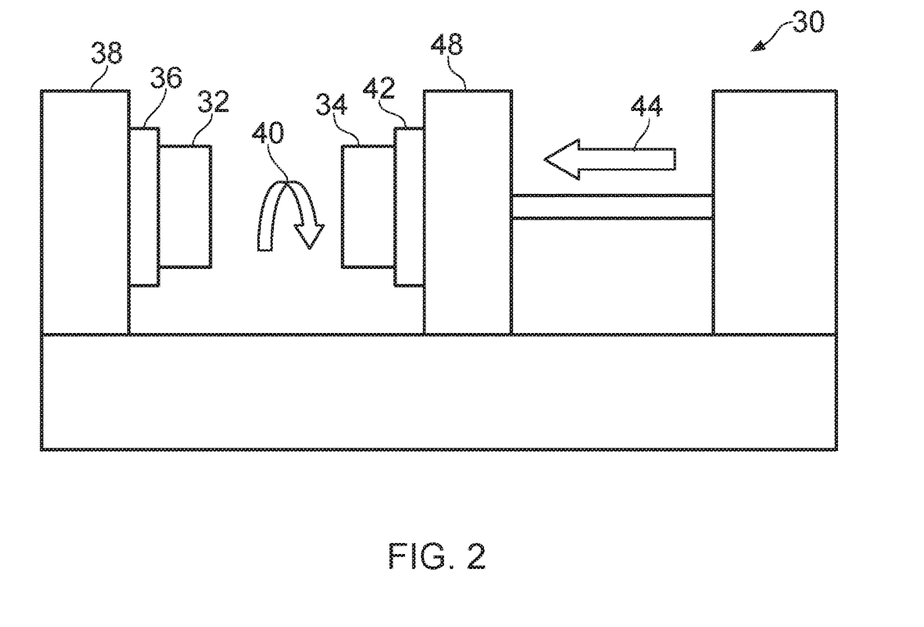
FIG. 2 is a schematic side view of a rotary friction welding apparatus for rotary friction welding according to the present disclosure.

FIG. 2 shows a schematic side view of a rotary friction welding device 30 for rotary friction welding a first part 32 and a second part 34. The first part 32 is held by a first clamp 36 which is rotatably fixed to a supporting block 38. The first clamp 36 and first part 32 may rotate in the direction of arrow 40. The second part 34 is also held by a second clamp 42 which is fixed to a supporting block 48. The second part 34 is fixed in a non-rotational arrangement but the second part 34, the second clamp 42 and the supporting block 48 may be translated in the direction of arrow 44 towards the first part 32. To join the first and second parts 32 and 34 by rotary friction welding the first part 32 is rotated in the direction of arrow 40 whilst the second part 34 is pushed towards and into contact with the first part 32 by a forge pressure or an axial force denoted by arrow 44. The interface between the first and second parts 32 and 34 is heated by friction that enables the first and second parts 32 and 34 to be friction welded or friction bonded together. The first and second parts 32 and 34 in rotary friction welding are usually cylindrical in nature and are either hollow or solid.

The first and second parts 32 and 34 may for example be portions of the interconnecting shaft 20 between the high pressure turbine 16 and the high pressure compressor 14, portions of the interconnecting shaft 21 between the intermediate pressure turbine 17 and the intermediate pressure compressor 13 or portions of the interconnecting shaft 22 between the low pressure turbine 18 and the fan 12. The first and second parts may also be a rotor and a shaft, e.g. a drum and a shaft, a disc and a shaft or two discs or two shafts. The drum may be a compressor drum, the disc may be a compressor disc or a turbine disc and the two discs may be two compressor discs or two turbine discs.

As mentioned previously, it is difficult to rapidly, or instantaneously, decelerate the friction welding apparatus due to the large inertia, or large mass of the friction welding apparatus.

Figure 3:
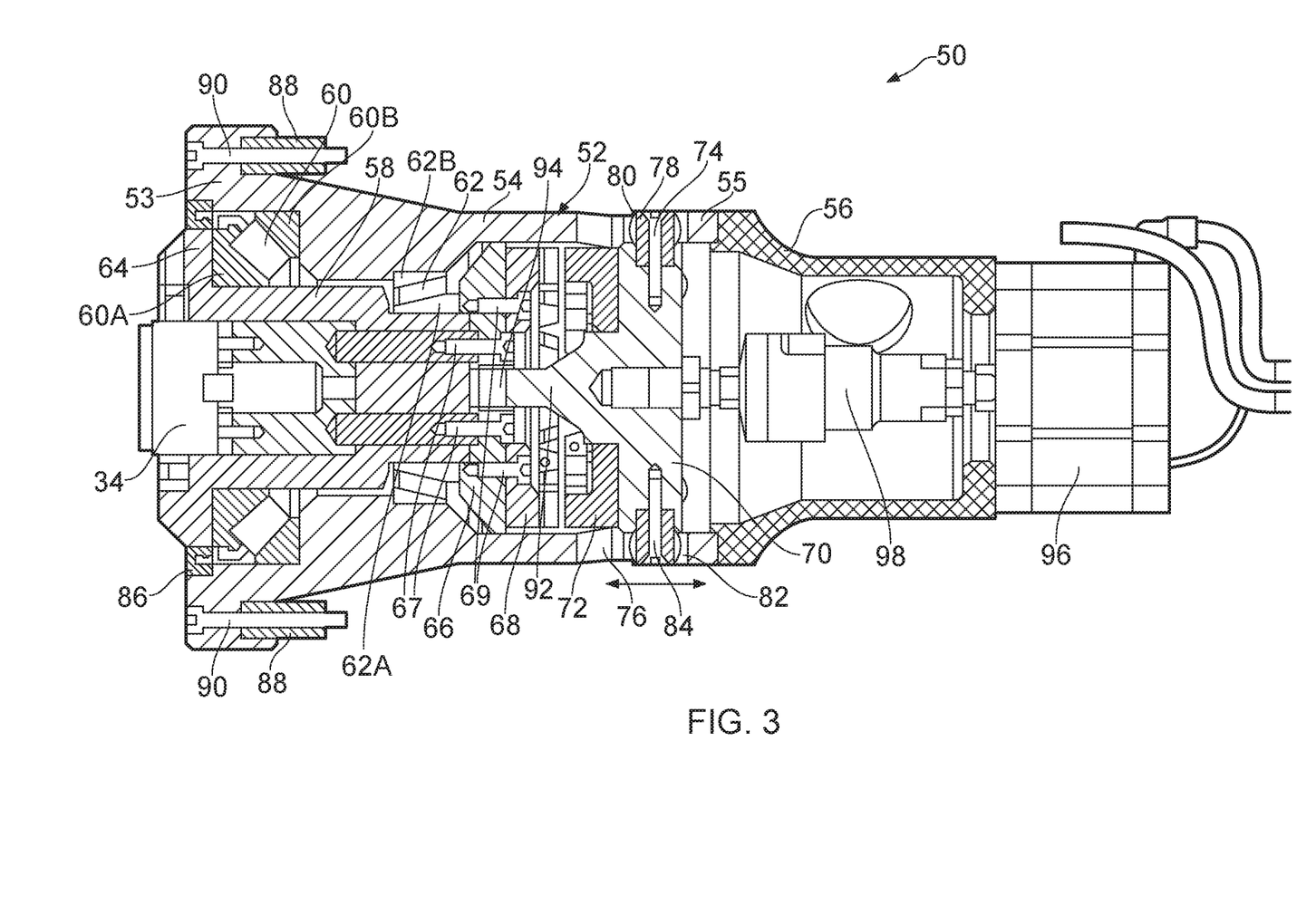
FIG. 3 is an enlarged cross-sectional view of tooling for the rotary friction welding apparatus shown in FIG. 2.
Figure 4:
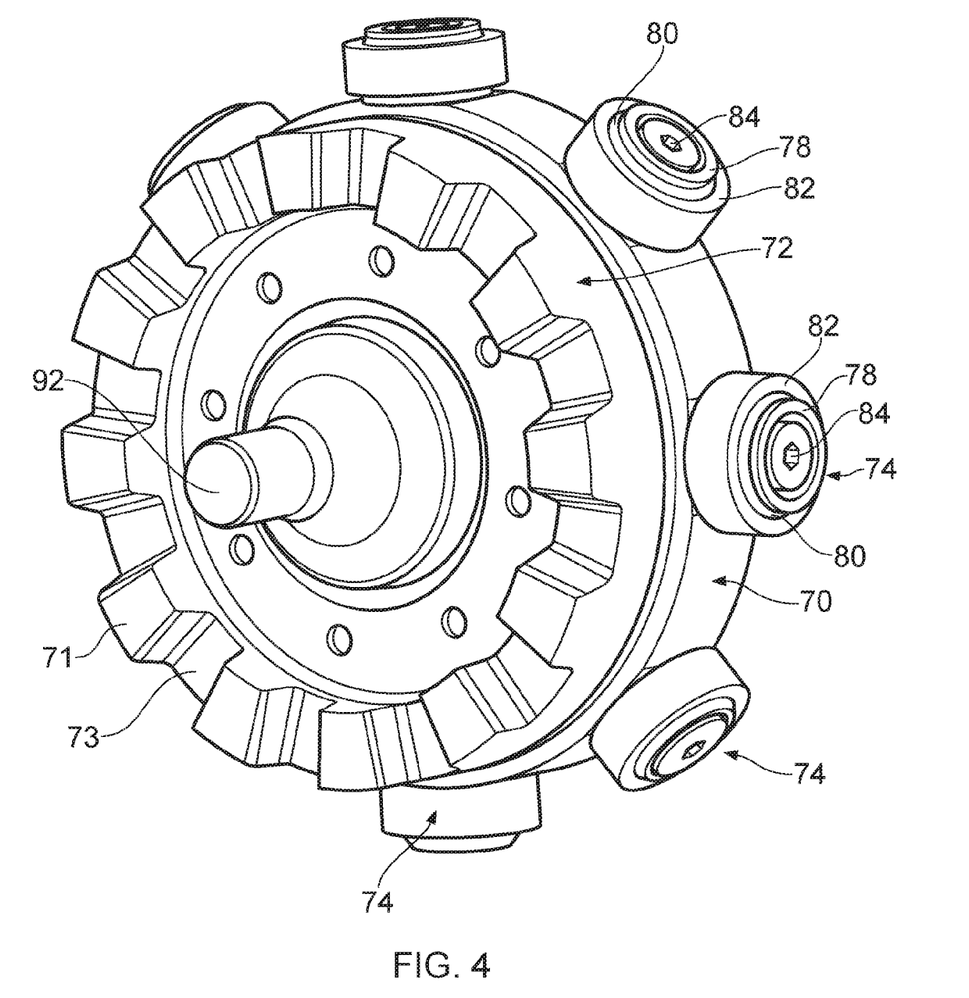
FIG. 4 is a further enlarged perspective view of the carrier and second half of the coupling of the tooling shown in FIG. 3.
Figure 5:
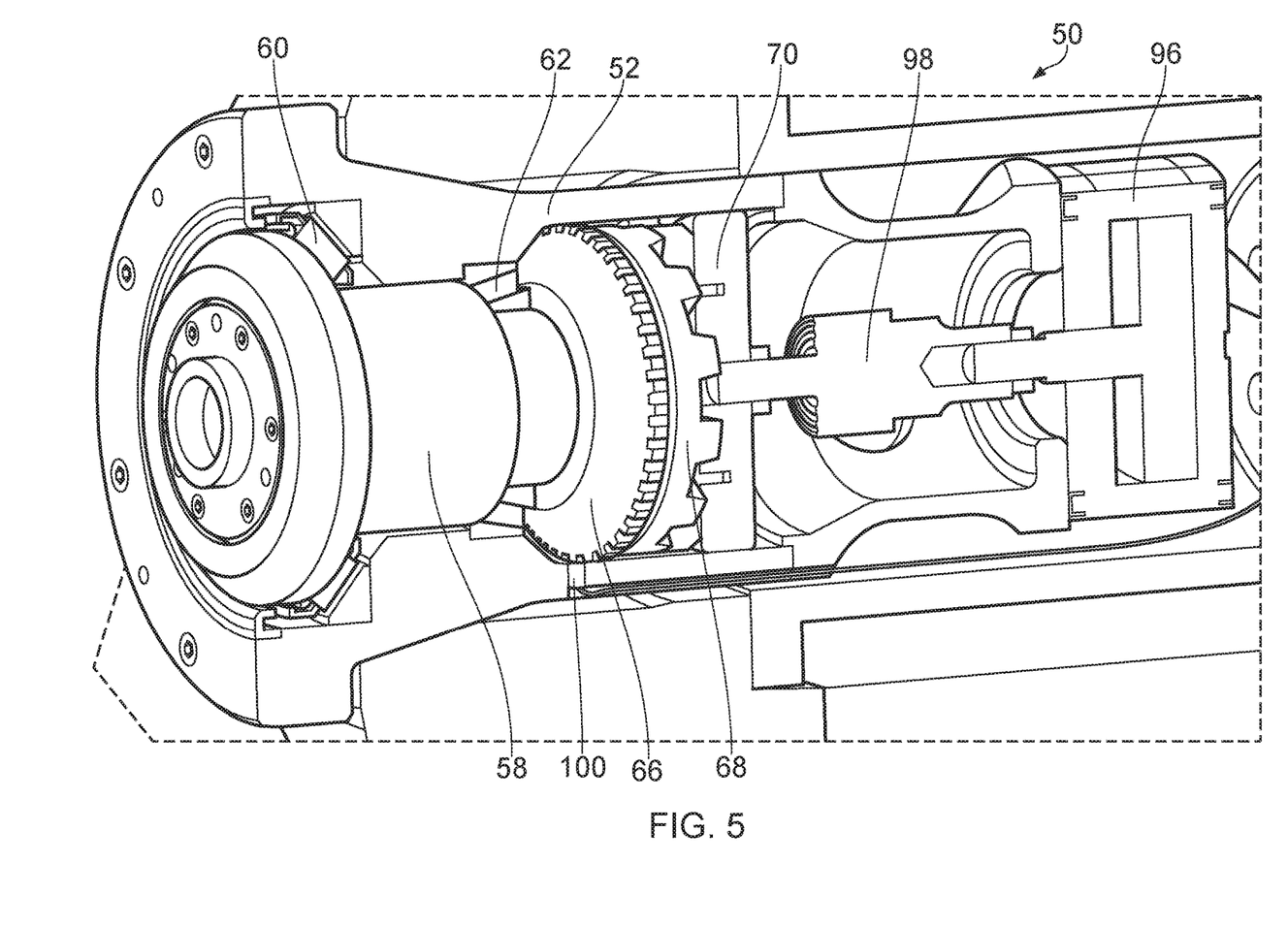
FIG. 5 is cut away perspective view of the tooling shown in FIG. 3.

FIGS. 3 to 5 shows the tooling 50 for the second clamp 42. The tooling 50 comprises a hollow main body 52 comprising a first hollow part 54 and a second hollow part 56. The first and second hollow parts 54 and 56 are coaxial, are arranged axially adjacent each other and are secured together, for example by a plurality of circumferentially spaced bolts. The first hollow part 54 has a first axial end 53 and a second axial end 55. The first hollow part 54 increases in diameter towards the first axial end 53. The diameter of inner surface of the first hollow part 54 is at a maximum at the first axial end 53 of the first hollow part 54, the diameter of the inner surface of the first hollow part 54 is at a minimum at an axial mid portion of the first hollow part 54 and the diameter of the inner surface at the second axial end 55 of the hollow part 54 is less than the maximum diameter and greater than the minimum diameter. The second axial end 55 of the first hollow part 54 is secured to the second hollow part 56.

A rotor 58 is arranged coaxially within the first hollow part 54 and is rotatably mounted within the first hollow part 54 by a first bearing 60 and a second bearing 62 axially spaced from the first bearing 60. The first bearing 60 may be a thrust bearing, e.g. spherical thrust bearing. The second bearing 62 may be a roller bearing, e.g. a tapered roller bearing. The first bearing 60 has an inner race 60A and an outer race 60B. The second bearing 62 has an inner race 62A and an outer race 62B. The first bearing 60 is located at the first axial end 53 of the first hollow part 54 and the second bearing 62 is located at the axial mid portion of the first hollow part 54. The rotor 58 has an integral flange 64 at a first axial end and has a disc 66 removably secured to the rotor 58 at a second axial end for example by a plurality of bolts 67. The first bearing 60 is positioned axially between the flange 64 and the axial mid portion of the first hollow part 54. The second bearing 62 is positioned axially between the disc 66 and the axial mid portion of the first hollow part 54. A first half of a coupling, e.g. a curvic coupling, 68 is removably secured to the disc 66 for example by a plurality of bolts 69. The diameters of the disc 66 and the first half of the coupling 68 are less than the diameter of the inner surface of the second axial end 55 of the first hollow part 54.

A carrier 70 is also arranged coaxially within the first hollow part 54 and is mounted within the first hollow part 54 such that it is able to move axially within the first hollow part 54 but is prevented from rotating. A second half of the coupling, e.g. a curvic coupling, 72 is removably secured to the carrier 70 for example by a plurality of bolts. The carrier 70 has a plurality of circumferentially spaced members 74 which extend radially therefrom. The second axial end 55 of the first hollow part 54 has a plurality of circumferentially spaced axially extending slots 76 and each member 74 is arranged to locate in a respective one of the axially extending slots 76. The slots 76 and members 74 allow the carrier 70 to move axially within the first hollow part 54 and prevent the carrier 70 from rotating with respect to the hollow main body 52. The slots 76 extend completely radially through the first hollow part 54. Each member 74 comprises a cylindrical pin 78 which locates in a cylindrical bore in the carrier 70 and the radially outer end of each pin 78 has a flange. Each member 74 also comprises an inner ring 80 and an outer ring 82. The inner ring 80 has a cylindrical inner surface to locate on a cylindrical outer surface of the pin 78 and a part spherical outer surface. The outer ring 82 has a part spherical inner surface to locate on the part spherical inner surface of the inner ring 80 and a cylindrical outer surface to locate in the corresponding axially extending slot 76 in the second axial end 55 of the first hollow part 54. Each pin is secured to the carrier 70 by a bolt 84. The outer ring 82 may comprise two halves to allow assembly. The members 78 are anti-rotation bearings. Each inner ring 80 and respective outer ring 82 form a spherical bearing. Theses spherical bearings reduce friction within the axially extending slots 76 and provide compliance under extreme loads.

It may be equally possible for the slots 76 to extend part way radially through the first hollow part 54 such that the slots are grooves on the inner surface of the first hollow part 54. However, in such an arrangement the grooves 76 extend axially to the end of the first hollow part 54 to enable assembly of the carrier 70 within the first hollow part 54 and the second hollow part 56 defines the ends of the grooves.

An annular seal 86 is provided between the flange 64 of the rotor 58 and the first axial end 53 of the first hollow part 54. The first axial end 53 of the first hollow part 54 has a plurality of circumferentially spaced hollow dowels 88 and respective bolts 90 to secure the tooling 50 to a collet body of the rotary friction welding apparatus.

The carrier 70 has a coaxial spigot 92 which is arranged to move into and out of location in a coaxial bore 94 in the rotor 58. An actuator, e.g. a pneumatic actuator, 96 is mounted on the second hollow part 56 and the actuator 96 is connected to the carrier 70 by a drive rod 98 such that the actuator 96 may move the carrier 70 axially within the hollow main body 52. The actuator 96 is used to move the second half of the coupling 72 into and out of engagement with the first half of the coupling 68. The movement of the second half of the coupling 72 into and out of engagement with the first half of the coupling 68 moves the spigot 92 into and out of location in the coaxial bore 94 in the rotor 58. The first and second halves of the coupling 68 and 72 comprise a plurality of circumferentially spaced radially extending teeth and radially extending grooves to transmit torque from the second half of the coupling 72 to the first half of the coupling 68. The position and length of the axially extending slots 76 are arranged such that the carrier 70 is able to move axially between a first position in which the second half of the coupling 72 engages the first half of the coupling 68 and a second position in which the second half of the coupling 72 is disengaged from the first half of the coupling 68. The position and length of the axially extending slots 76 are arranged such that the carrier 70 is able to move axially between a first position in which the teeth of the second half of the coupling 72 engages the grooves of the first half of the coupling 68 and a second position in which the teeth of the second half of the coupling 72 are disengaged from the grooves of the first half of the coupling 68. FIG. 4 shows the radially extending teeth 71 and the radially extending grooves 73 of the second half coupling 72. The first half of the coupling 68 has correspondingly shaped radially extending teeth and radially extending grooves.

FIG. 5 shows an inductive sensor 100 mounted on the first hollow part 54 of the main body 52 and is spaced radially from the disc 66 provided on the rotor 58. The rim of the disc 66 is provided with a plurality of equi-circumferentially spaced radially extending teeth. The inductive sensor 100 measures the speed of rotation of the rotor 58 by detecting the passage of the teeth and sends an electrical signal to a control unit (not shown). When the first and second halves of the coupling 68 and 72 are engaged a normal friction weld may be produced. When the first and second halves of the coupling 68 and 72 are disengaged part way, or midway, through the friction welding process the first half of the coupling 68 and hence the rotor 58 will rapidly accelerate, as discussed later. The inductive sensor 100 monitors, e.g. measures, the acceleration of the first half of the coupling 68 and the rotor 58. The inductive sensor 100 is also used to monitor, e.g. measure, the rotational position of the rotor 58 and the first half of the coupling 68 so as to align the first and second halves of the coupling 68 and 72 prior to engagement of the first and second halves of the coupling 68 and 72 to enable the first and second halves of the coupling 68 and 72 to be engaged before the friction welding takes place.

The actuator 96 may comprise one or more electronically actuated pneumatic solenoid valves arranged to push or pull the rod 98.

The first and second halves of the coupling 68 and 72 are designed to allow disengagement whilst being subjected to large torques, for example 15 to 20 KNm of torque, e.g. 19 KNm torque. The design is applicable to friction welding apparatus applying forces and torque equal to and greater than 500 kN force and 19 kNm torque.

The second part 34 to be welded is held coaxially by the rotor 58 at the first axial end of the rotor 58.

In operation the second part 34 to be friction welded is loaded and secured onto the first axial end of the rotor 58. The actuator 96 is operated to move the carrier 70 axially so that the second half of the coupling 72 engages the first half of the coupling 68 on the rotor 58 to prevent rotation of the rotor 58 and hence rotation of the second part 34. As mentioned above the first part 32 is rotated while the second part 34 is held stationary and the second part 34 is pushed axially against the first part 32 and into contact with the first part 32 by a forge pressure or an axial force 44. The interface between the first and second parts 32 and 34 is heated by friction that enables the first and second parts 32 and 34 to be friction welded or friction bonded together. All of the torque from the friction welding process is transmitted through the first and second halves of the coupling 68 and 72 whilst being isolated from any forging force, e.g. axial force. The forging force, e.g. axial force is transmitted through the rotor 58 and the thrust bearing 60 into the main body 52.

The actuator 96 is operated during the friction welding process to allow the second part 34 to be rapidly, substantially instantaneously, released from being held rotationally stationary. The actuator 96 is operated to move the second half of the coupling 72 axially away from the first half of the coupling 68 such that the second half of the coupling 72 is disengaged from the first half of the coupling 68. The disengagement of the first and second halves of the coupling 68 and 72 enables the first and second parts 32 and 34 to solidify without them being subjected to differential rotational forces.

Although the present disclosure has referred to a pneumatic actuator, it may be possible to use a hydraulic actuator or an electric actuator. Although the present disclosure has referred to a Curvic coupling other suitable couplings may be used, e.g. a Hirth coupling.

In an alternative arrangement (not shown) one or more resilient members, e.g. springs are provided between the rotor and the carrier to bias the first half coupling and the rotor and the second half coupling and the carrier away from each other. One or more bolts maintain the carrier and the second half of the coupling in engagement with the rotor and the first half of the coupling. A charge of explosive and a detonator are provided in each bolt. The explosive is triggered to allow the second half of the coupling to be disengaged from the first half of the coupling by the resilient members, springs.

In a further arrangement (not shown) one or more resilient members, e.g. springs are provided between the rotor and the carrier to bias the first half coupling and the rotor and the second half coupling and the carrier away from each other. An actuator and rod are arranged to push the carrier and the second half of the coupling into engagement with the rotor and the first half of the coupling. The actuator is triggered to stop pushing to allow the second half of the coupling to be disengaged from the first half of the coupling by the resilient members, springs.

Although the present disclosure has been described with reference to the tooling holding the second, stationary, part it may also be possible to arrange the tooling to hold the first, rotating, part. In this case the second half of the coupling is moved out of engagement with the first half of the coupling to allow the rotating part to be decelerated with the stationary part. However, this requires a more complicated arrangement for providing services to the tooling for example by providing wireless transmission of data and signals and routing services through relatively rotating joints.

The advantage of the present disclosure is that it provides a friction welding apparatus and a method of friction welding in which the rotationally stationary part to be welded is rapidly, instantaneously, free to rotate with the rotating part to be welded. The advantage of the present disclosure is that it also provides a friction welding apparatus and a method of friction welding in which the rotating part to be welded is rapidly, instantaneously, free to stop rotating with the stationary part to be welded. The present disclosure provides a friction welding apparatus and a method of friction welding which rapidly, or instantaneously, decouples the parts that have been friction welded together from the friction welding apparatus, e.g. it decouples the parts from the first clamp or the second clamp.

Rotary friction welding includes, in particular, inertia welding. However, the invention is equally applicable to other rotary friction welding processes where an axial load is available.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A rotary friction welding apparatus comprising:
   a first clamp for holding a first part to be welded by rotary friction welding;
   a second clamp for holding a second part to be welded by rotary friction welding;
   a device for producing relative rotation between the first clamp and the second clamp;
   a forge for applying an axial forging pressure to the parts to be welded when the parts are located in the clamps, the second clamp being mounted on a first half of a coupling, a second half of the coupling being movable axially between a first position and a second position, wherein
   in the first position the second half of the coupling is engaged with the first half of the coupling to enable relative rotation between the first clamp and the second clamp and in the second position the second half of the coupling is disengaged from the first half of the coupling to stop relative rotation between the first clamp and the second clamp,
   the rotary friction welding apparatus further comprising:
   a hollow main body:
   a rotor, and
   a carrier, wherein
   the rotor and the carrier are arranged coaxially within the hollow main body,
   the rotor is rotatably mounted in the hollow main body,
   the second clamp is arranged on a first axial end of the rotor,
   the first half of the coupling is arranged on a second axial end of the rotor,
   the carrier is axially movable and non rotatably mounted in the hollow main body, and
   the second half of the coupling is arranged on a first axial end of the carrier.

2. The rotary friction welding apparatus as claimed in claim 1 wherein:
   the device for producing relative rotation is arranged to rotate the first clamp, the second half of the coupling is mounted on a rotationally static structure;
   in the first position the second half of the coupling is engaged with the first half of the coupling to prevent rotation of the second clamp and enable relative rotation between the first clamp and the second clamp; and
   in the second position the second half of the coupling is disengaged from the first half of the coupling to enable rotation of the second clamp and stop relative rotation between the first clamp and the second clamp.

3. The rotary friction welding apparatus as claimed in claim 1 wherein the first and second half couplings are first and second half curvic couplings.

4. The rotary friction welding apparatus as claimed in claim 1 wherein the first and second half couplings are first and second half Hirth couplings.

5. The rotary friction welding apparatus as claimed in claim 1 wherein the rotor is rotatably mounted in the hollow main body by at least one bearing.

6. The rotary friction welding apparatus as claimed in claim 5 wherein the rotor is rotatably mounted in the hollow main body by two bearings, a first bearing is a thrust bearing and a second bearing is a roller bearing.

7. The rotary friction welding apparatus as claimed in claim 1 wherein the hollow main body has a plurality of axially extending slots, the carrier has a plurality of radially extending members and each radially extending member of the carrier locates in a respective one of the axially extending slots in the hollow main body.

8. The rotary friction welding apparatus as claimed in claim 7 wherein each radially extending member comprises an anti-rotation bearing.

9. The rotary friction welding apparatus as claimed in claim 8 wherein each anti-rotation bearing comprises:
a pin;
a first ring; and
a second ring, wherein
the first ring has a part spherical outer surface,
the first ring is arranged around the pin,
the second ring has a part spherical inner surface,
the second ring is arranged around the first ring, and
the pin is arranged to locate in an aperture in the carrier.

10. The rotary friction welding apparatus as claimed in claim 1 wherein the first axial end of the carrier has a coaxial spigot, the second end of the rotor has a coaxial bore.

11. The rotary friction welding apparatus as claimed in claim 1 comprising an actuator to move the second half of the coupling into and out of engagement with the first half of the coupling.

12. The rotary friction welding apparatus as claimed in claim 11 wherein the actuator comprises a pneumatic actuator, a hydraulic actuator or an electric actuator.

13. The rotary friction welding apparatus as claimed in claim 1 wherein a sensor is arranged to measure the speed of rotation of the rotor.

14. The rotary friction welding apparatus as claimed in claim 1 wherein a sensor is arranged to measure the rotational position of the rotor.

15. The rotary friction welding apparatus as claimed in claim 13 wherein the sensor comprises an induction sensor, the induction sensor is mounted on the hollow main body and the rotor comprises a plurality of circumferentially spaced radially extending teeth.

16. A method of rotary friction welding a first part to a second part with a rotary friction welding apparatus, the method comprising the steps of:
locating the first part in a first clamp of the rotary friction welding apparatus, locating the second part in a second clamp of the rotary friction welding apparatus, the second clamp being mounted on a first half of a coupling of the rotary friction welding apparatus, a second half of the coupling of the rotary friction apparatus being movable axially between a first position in which the second half of the coupling is engaged with the first half of the coupling and a second position in which the second half of the coupling is disengaged from the first half of the coupling;
positioning the second half of the coupling in the first position to enable relative rotation between the first part and the second part;
rotating the first part relative to the second part with a device of the rotary friction welding apparatus that produces relative rotation between the first clamp and the second clamp and applying an axial forging pressure with a forge of the rotary friction welding apparatus to friction weld the first part to the second part; and
moving the second half of the coupling to the second position to disengage the second half of the coupling from the first half of the coupling to stop relative rotation between the first part and the second part to allow the friction weld to solidify, wherein
the rotary friction welding apparatus further comprising a hollow main body, a rotor and a carrier, the rotor and the carrier are arranged coaxially within the hollow main body, the rotor is rotatably mounted in the hollow main body, the second clamp is arranged on a first axial end of the rotor, the first half of the coupling is arranged on a second axial end of the rotor, the carrier is axially movable and non rotatably mounted in the hollow main body and the second half of the coupling is arranged on a first axial end of the carrier.

17. The method as claimed in claim 16 comprising rotating the first clamp, mounting the second half of the coupling on a rotationally static structure, the method further comprising positioning the second half of the coupling in the first position to prevent rotation of the second clamp and enable relative rotation between the first clamp and the second clamp and moving the second half of the coupling to the second position to disengage the second half of the coupling from the first half of the coupling to enable rotation of the second clamp and stop relative rotation between the first clamp and the second clamp.

18. The method as claimed in claim 16 wherein the first and second parts are selected from the group consisting of a rotor and a shaft, a first rotor and a second rotor, and a first shaft and a second shaft.

19. A rotary friction welding apparatus comprising:
a first clamp for holding a first part to be welded by rotary friction welding;
a second clamp for holding a second part to be welded by rotary friction welding;
a device for producing relative rotation between the first clamp and the second clamp; and
a forge for applying an axial forging pressure to the parts to be welded when the parts are located in the clamps, wherein
the second clamp being mounted on a first half of a coupling, a second half of the coupling being movable axially between a first position and a second position, wherein in the first position the second half of the coupling is engaged with the first half of the coupling to enable relative rotation between the first clamp and the second clamp and in the second position the second half of the coupling is disengaged from the first half of the coupling to stop relative rotation between the first clamp and the second clamp,
the rotary friction welding device further comprising a hollow main body, a rotor and a carrier, the rotor and the carrier are arranged coaxially within the hollow body,
the rotor is rotatably mounted in the hollow main body, the second clamp is arranged on a first axial end of the rotor, the first half of the coupling is arranged on a second axial end of the rotor, the carrier is axially movable and non rotatably mounted in the hollow main body and the second half of the coupling is arranged on a first axial end of the carrier, and
the hollow main body has a plurality of axially extending slots, the carrier has a plurality of radially extending members and each radially extending member of the carrier locates in a respective one of the axially extending slots in the hollow main body.

* * * * *